(12) United States Patent
Nakamura et al.

(10) Patent No.: US 10,618,475 B2
(45) Date of Patent: Apr. 14, 2020

(54) IMAGING APPARATUS

(71) Applicant: DENSO CORPORATION, Kariya, Aichi-pref. (JP)

(72) Inventors: Mitsuru Nakamura, Kariya (JP); Nobuhisa Shimizu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 58 days.

(21) Appl. No.: 15/824,825

(22) Filed: Nov. 28, 2017

(65) Prior Publication Data

US 2018/0148000 A1 May 31, 2018

(30) Foreign Application Priority Data

Nov. 29, 2016 (JP) ................................. 2016-231370

(51) Int. Cl.
*H04N 9/47* (2006.01)
*B60R 11/04* (2006.01)
*H04N 5/225* (2006.01)
*H04N 5/232* (2006.01)

(52) U.S. Cl.
CPC ............ *B60R 11/04* (2013.01); *H04N 5/2252* (2013.01); *H04N 5/2253* (2013.01); *H04N 5/2254* (2013.01); *H04N 5/23229* (2013.01)

(58) Field of Classification Search
CPC ......... B24B 21/20; B24B 23/06; B60R 11/04; B60R 2011/0026; B60R 1/00; B60R 1/04; B60R 1/12; B60R 2001/1215; B60R 2001/1253; B60R 2300/102; B60R 2300/105

USPC ........................................................ 348/148
See application file for complete search history.

(56) References Cited

U.S. PATENT DOCUMENTS

| 2007/0182649 | A1  | 8/2007 | Kondou |
| 2008/0184825 | A1* | 8/2008 | Li ....................... G01M 99/008 73/865.9 |
| 2010/0067898 | A1* | 3/2010 | Arbuckle ............... G03B 17/08 396/535 |

(Continued)

FOREIGN PATENT DOCUMENTS

| DE | 102010023293 A1 * | 12/2011 | ............ B60R 11/04 |
| JP | H0550797 U | 7/1993 | |

(Continued)

*Primary Examiner* — Masum Billah
(74) *Attorney, Agent, or Firm* — Knobbe, Martens, Olson & Bear, LLP

(57) ABSTRACT

In an imaging apparatus for mounting to a windshield of a vehicle, a cover includes a bottom wall arranged to cover the opening bottom wall of a camera-module case member and the opening bottom wall of a board case member, and a rear wall arranged to cover the opening rear wall of the camera-module case member. At least one of the bottom wall and the rear wall has fastening portions at which the case and the cover are closely fastened to each other. The fastening portions include at least first and second adjacent fastening portions having an interval therebetween. The interval is set to be equal to or less than half of a wavelength of a signal having a predetermined maximum frequency. The signal having the maximum frequency is used by at least one device installable in the vehicle or the signal is expected to be received by the processing board as noise.

8 Claims, 5 Drawing Sheets

(56) References Cited

U.S. PATENT DOCUMENTS

2015/0042804 A1* 2/2015 Okuda .................. B60R 11/04
                                                    348/148
2016/0006911 A1   1/2016 Kimura et al.
2018/0069994 A1   3/2018 Nakamura

FOREIGN PATENT DOCUMENTS

| JP | 2003-156898 A |   | 5/2003 |
|----|---------------|---|--------|
| JP | 2010-028956 A |   | 2/2010 |
| JP | 2015000713 A  | * | 1/2015 |
| JP | 2015-120492   |   | 7/2015 |
| JP | 2015120492 A  | * | 7/2015 |

* cited by examiner

IMAGING APPARATUS

CROSS REFERENCE TO RELATED APPLICATION

This application is based on and claims the benefit of priority from Japanese Patent Applications No. 2016-231370 filed on Nov. 29, 2016, the disclosure of which is incorporated in its entirety herein by reference.

TECHNICAL FIELD

The present disclosure relates to imaging apparatuses installable to or actually installed to vehicles.

BACKGROUND

Japanese patent application publication No. 2015-120492 discloses an imaging apparatus mountable to a predetermined position of the top center of the inner surface of the vehicle's front windshield. The predetermined position of the top center of the inner surface of the front windshield is located close to the base portion of a rearview mirror; the base portion of the rearview mirror is located at the inner surface of the front windshield.

The imaging apparatus includes a camera module, which is comprised of a camera and an optical system, for capturing images and outputting image signals based on the captured images, and a processing board for processing the image signals output from the camera module.

The imaging apparatus also includes a housing. The housing is comprised of a case having an opening bottom, and a cover attached to the periphery of the opening bottom of the case to thereby provide, thereinside, a storage space in which the camera module and the processing board are installed.

SUMMARY

The cover is swaged or riveted to the periphery of the opening bottom of the case. Commonly, bending a single metallic flat plate forms the cover shaped to be attachable to the periphery of the opening bottom of the case.

An aging deformation of the bent cover toward its original flat shape may result in at least part of the cover being separated from the periphery of the opening bottom of the case, resulting in a gap between the at least part of the cover and the periphery of the opening bottom of the case. This may cause external noise to easily enter the inside of the case via the gap and/or internal noise to leak from the inside of the case via the gap. This may result in the imaging apparatus being sensitive to the external noise and/or in other peripheral devices around the imaging apparatus being sensitive to the internal noise leaking from the imaging apparatus.

In view these requirements, an exemplary aspect of the present disclosure seeks to provide imaging apparatuses, each of which is capable of reducing internal noise leaking therefrom and/or reducing entrance of external noise into the imaging apparatus.

According to a first exemplary aspect of the present disclosure, there is provided an imaging apparatus for mounting to a windshield of a vehicle, the vehicle having a predetermined front-rear direction and a predetermined vertical direction. The imaging apparatus includes a camera module configured to capture an image, and output an image signal based on the captured image. The imaging apparatus includes a processing board arranged to be lower than the camera module in the vertical direction and configured to receive the image signal output from the camera module, and perform at least one image-processing task based on the received image signal. The imaging apparatus includes a case. The case includes a camera-module case member having an opening bottom wall in the vertical direction and an opening rear wall in the front-rear direction and configured to store the camera module, and a board case member having an opening bottom wall in the vertical direction and configured to store the processing board. The imaging apparatus includes a cover fastened to the case. The cover includes a bottom wall arranged to cover the opening bottom wall of the camera-module case member and the opening bottom wall of the board case member, and a rear wall arranged to cover the opening rear wall of the camera-module case member. At least one of the bottom wall and the rear wall has a plurality of fastening portions at which the case and the cover are closely fastened to each other. The plurality of fastening portions include at least first and second adjacent fastening portions having an interval therebetween. The interval is set to be equal to or less than half of a wavelength of a signal having a predetermined maximum frequency. The signal having this maximum frequency is used by at least one device installable in the vehicle or is expected to be received by the processing board as noise.

According to a second exemplary aspect of the present disclosure, there is provided an imaging apparatus for mounting to a windshield of a vehicle, the vehicle having a predetermined front-rear direction, a predetermined right-left direction, and a predetermined vertical direction. The imaging apparatus includes a camera module configured to capture an image, and output an image signal based on the captured image. The imaging apparatus includes a processing board arranged to be lower than the camera module in the vertical direction and configured to receive the image signal output from the camera module, and perform at least one image-processing task based on the received image signal. The imaging apparatus includes an external connector connected to the processing board and configured to externally output a result of the at least one image-processing task. The imaging apparatus includes a case. The case includes a camera-module case member having an opening bottom wall in the vertical direction and an opening rear wall in the front-rear direction and configured to store the camera module. The case includes a board case member arranged at a front side of the camera-module case member and having an opening bottom wall in the vertical direction. The board case member is configured to store the processing board. The case includes a connector case member arranged adjacent to the camera-module case member and arranged at a rear side of the board case member. The connector case member has an opening bottom wall in the vertical direction, and is configured to store the external connector. The imaging apparatus includes a cover fastened to the case. The cover includes a bottom wall arranged to cover the opening bottom walls of the respective camera-module case member, the board case member, and the connector case member. The cover includes a rear wall arranged to cover the opening rear wall of the camera-module case member. The imaging apparatus includes first to seventh bolts. The rear wall has first and second through holes formed therethrough at respective upper corners thereof. The bottom wall has third and fourth through holes formed therethrough. The third through hole is substantially aligned with the first through hole in the front-rear direction to face a first boundary portion between the camera-module case member and the board case member. The fourth through hole is arranged to face a second boundary portion between the camera-module case member, the board case member, and the connector case member. The bottom wall has fifth and sixth through holes formed through respective front corners of the bottom wall and aligned with each other in the right-left direction. The fifth through hole is aligned with the third through hole. The sixth through hole is aligned with the fourth through hole. The bottom wall has a seventh through hole formed therethrough and substantially aligned with the second through hole in the front-rear direction. The seventh through hole is substantially aligned with the third through hole in the right-left direction. The first to seventh bolts are fitted through the respective first to seventh through holes to thereby fasten the case and the cover to each other. The first and second through holes have a first interval therebetween, the first and third through holes have a second interval therebetween, the third and fifth through holes have a third interval therebetween, and the fifth and sixth through holes have a fourth interval therebetween. The sixth and fourth through holes have a fifth interval therebetween, the fourth and seventh through holes have a sixth internal therebetween, the seventh and second through holes have a seventh interval therebetween, and the second and fourth through holes have an eighth interval therebetween. Each of the first to eighth intervals is set to be equal to or less than half of a wavelength of a signal having a predetermined maximum frequency. The signal having this maximum frequency is used by at least one device installable in the vehicle or is expected to be received by the processing board as noise. The camera module and the processing board are arranged in a closed circuit. The closed circuit is enclosed by a line passing through the first through hole, the second through hole, the seventh through hole, the fourth through hole, the sixth through hole, the fifth through hole, the third through hole, and the first through hole.

The imaging apparatus according to each of the first and second exemplary aspects prevents, even if the cover is deformed due to any cause, gaps whose lengths are longer than half of the wavelength from occurring between the case and the cover. This results in reduction in noise leakage from the inside of the assembly of the case and cover to the outside of the assembly of the case and cover and/or noise entrance into the inside of the assembly of the case and cover from the outside of the assembly of the case and cover even if the cover is deformed.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
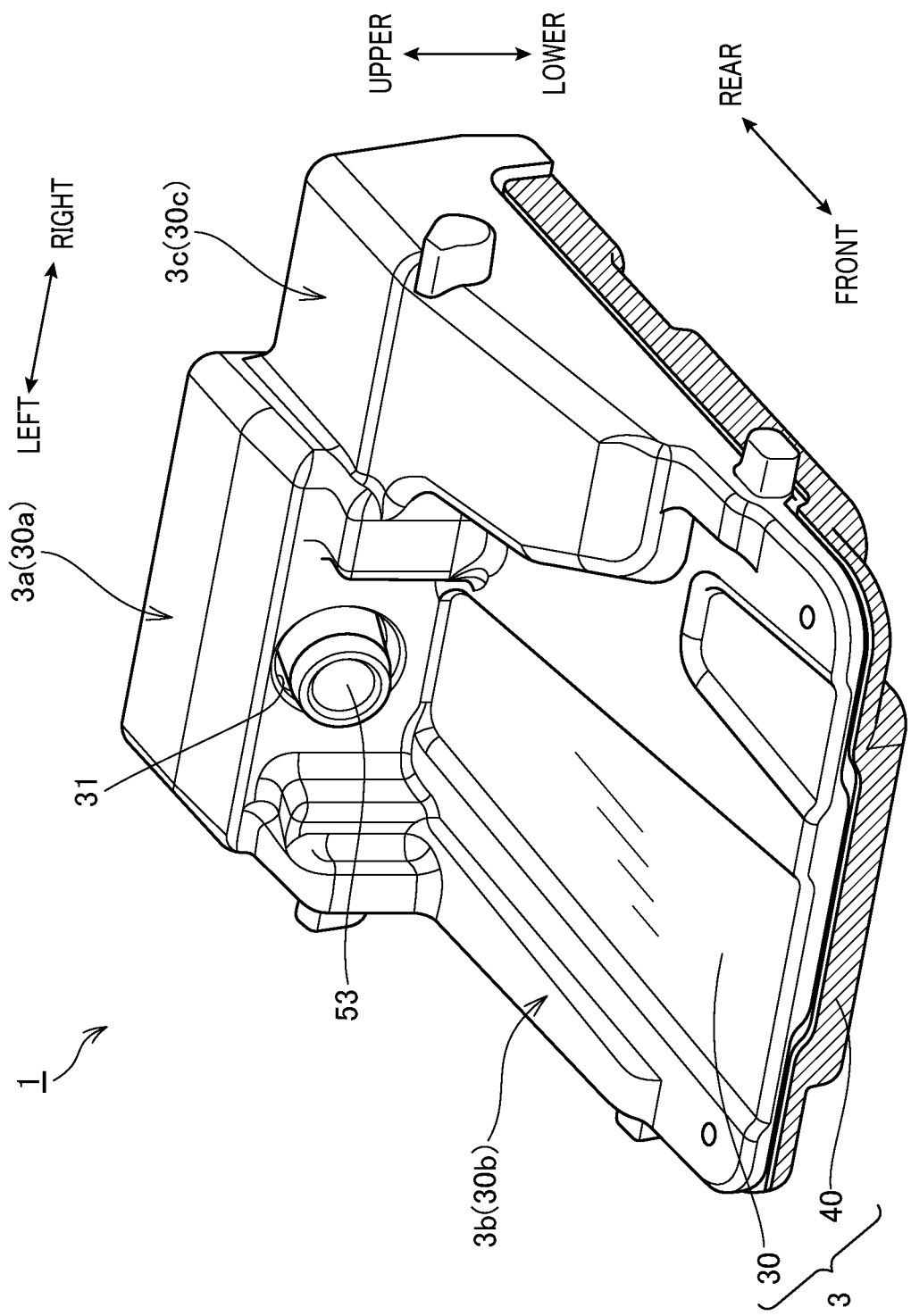
FIG. 1 is a perspective view schematically illustrating the appearance of an imaging apparatus when viewed from the upper front right direction relative to the imaging apparatus.
Figure 2:
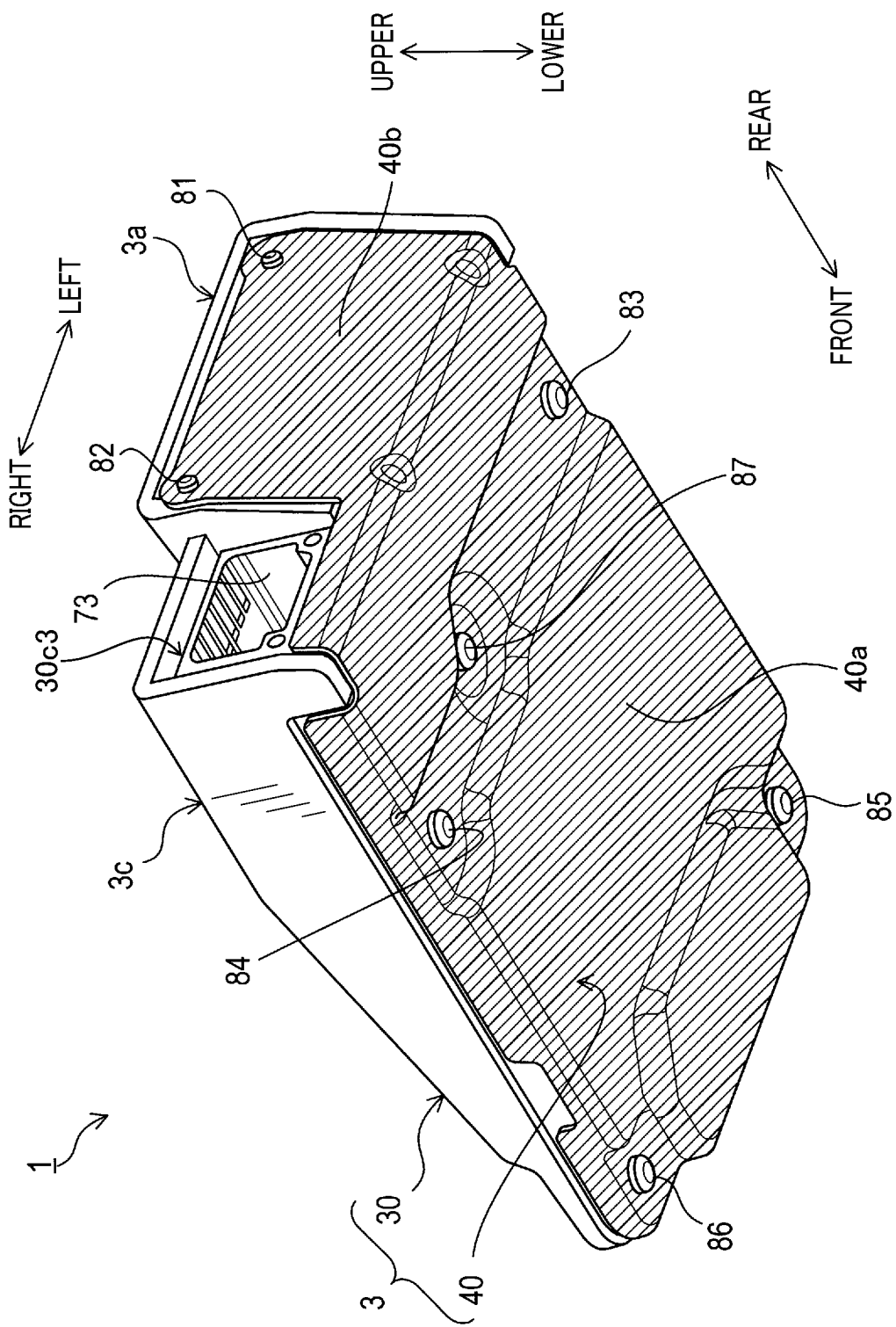
FIG. 2 is a perspective view schematically illustrating the appearance of the imaging apparatus when viewed from the lower rear right direction relative to the imaging apparatus.

The following describes an exemplary embodiment of the present disclosure with reference to the accompanying drawings.

Overall Structure of Imaging Apparatus

The following describes an example of the overall structure of an imaging apparatus 1 according to the exemplary embodiment with reference to FIGS. 1 to 4.

Referring to FIGS. 1 to 4, the imaging apparatus 1 includes a housing 3, a camera module 5, and a processing board 7.

The imaging apparatus 1 is mountable to a predetermined position of the inner surface of, for example, the top center of the front windshield of a vehicle. The imaging apparatus 1 is operative to capture images in front of the vehicle. Note that, hereinafter, the vertical direction, i.e. the upper and lower direction, of each element of the imaging apparatus 1, is defined as the vertical direction, i.e. the upper and lower direction, of the corresponding element of the imaging apparatus 1 while the imaging apparatus 1 is mounted to the inner surface of the front windshield of the vehicle.

Similarly, hereinafter, the front direction of each element of the imaging apparatus 1, is defined as the extending direction of the optical axis of the camera module 5. The back direction of each element of the imaging apparatus 1 is defined as the direction opposite to the extending direction of the optical axis of the camera module 5.

Additionally, hereinafter, the right-left direction of each element of the imaging apparatus 1, is defined as the right-left direction of the corresponding element of the imaging apparatus 1 when viewed from the front side of the imaging apparatus 1.

Referring to FIGS. 1 to 4, the housing 3 is comprised of a case 30 and a cover 40, and the housing 3, i.e. the case 30, functionally includes a camera module part 3a, a hood part 3b, and a connector part 3c.

Referring to FIG. 1, the case 30 has a solid shape having a rectangular shape when viewed from above. The case 30 has an opening bottom wall and an opening rear wall. The case 30 has a predetermined length in the longitudinal direction of the imaging apparatus 1.

The case 30 includes a camera-module case member 30a having a substantially rectangular box shape with an opening bottom wall and located at the left-rear corner thereof, which constitutes the camera module part 3a for storing therein the camera module 5. In other words, the housing 3 includes the camera module part 3a in which the camera module 5 is installed.

The case 30 also includes a connector case member 30c having a substantially box shape with an opening bottom wall and located at the right-rear corner thereof and adjacent to the camera module member 30a. The connector case member 30c constitutes the connector part 3c for storing therein at least an external connector 73 described later. In other words, the housing 3 includes the connector part 3c in which at least the external connector 73 is installed.

The case 30 further includes a board case member 30b located ahead of the camera-module case member 30a and the connector case member 30c. The board case member 30b constitutes the board part 3b for storing therein the processing board 7. In other words, the housing 3 includes the board part 3b in which the processing board 7 is installed; the board part 3b will be referred to as a hood part 3b hereinafter.

The board case member 30b of the case 30 is comprised of a substantially rectangular flat chamber 30b1 with an opening bottom wall and an upward projecting chamber 30b2 projecting upwardly from the flat chamber 30b1 and located in front of the connector case member 30c. The upward projecting chamber 30b2 is integrated with the connector member 30c.

The camera-module case member 30a of the case 30 is integrated with the board case member 30b, and projects upwardly from the rectangular flat portion 30b1 of the board case member 30b. The connector case member 30c projects upwardly with respect to the rectangular flat portion 30b1 of the board case member 30b, and integrated with the camera-module case member 30a.

That is, the camera module part 3a is located substantially behind the hood part 3b, and the connector part 3c is also located substantially behind the hood part 3b.

The camera-module case member 30a has a front wall 30a1 through which an exposure hole 31 is formed; the exposure hole 31 permits the inside of the housing 3 to communicate with the outside of the housing 3.

The camera-module case member 30a also has an opening rear wall 30a2 opposite to the front wall 30a1.

The camera-module case member 30a is configured such that the camera module 5 is stored therein while a part of the camera module 5 is exposed to the outside of the camera-module case member 30a. The front direction of the imaging apparatus 1 can also be defined as the exposing direction of the part of the camera module 5 through the exposure hole 31. In other words, the imaging apparatus 1 is mounted to the vehicle while the front direction of the imaging apparatus 1 is aligned with the forward travelling direction of the vehicle.

Camera Module

Figure 3:
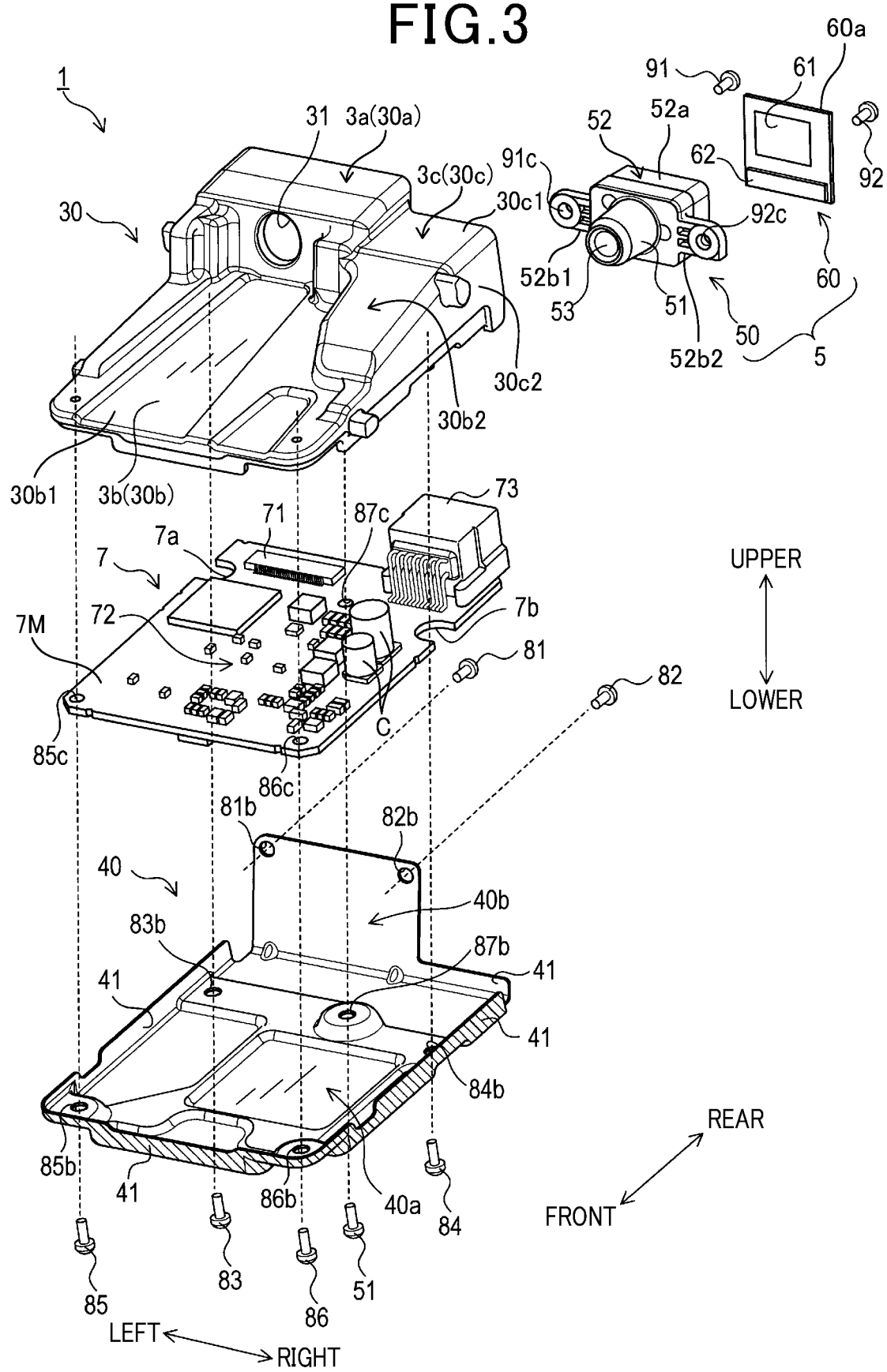
FIG. 3 is an exploded view schematically illustrating the imaging apparatus when viewed from the upper front right direction relative to the imaging apparatus.

Referring to FIG. 3, the camera module 5 is comprised of an optical unit 50 and an imaging board 60.

The optical unit 50 includes a lens barrel 51 having a substantially tubular shape, a lens holder 52, and a lens module 53.

The lens holder 52 includes a substantially plate-like base 52a with a through hole. The through hole is formed through the base 52a in the longitudinal direction of the imaging apparatus 1, i.e. in the thickness direction of the base 52a such that the through hole is coaxial with the exposure hole 31 when the camera module 5 is installed in the camera module part 3a.

The lens barrel 51 is mounted to a front major surface of the base 52a to be coaxial with the through hole of the base 52a.

The lens holder 52 also includes first and second attachments 52b1 and 52b2 extending outwardly from the lateral side edges of the front major surface of the base 52a in the respective opposite directions, i.e. the respective left and right directions. The first attachment 52b1 has, at its extending end, a through hole 91c formed therethrough, and the second attachment 52b2 has, at its extending end, a through hole 92c formed therethrough. The through holes 91c and 92c are used when the optical unit 50 is mounted to the camera module part 3a.

For example, the lens barrel 51 and the lens holder 52 are made of the same material, such as resin or metal, and integrally formed to each other.

The lens module 53 is comprised of one or more lenses installed in the lens barrel 51 while their optical axes are aligned with the center axis of the lens barrel 51.

The imaging board 60 includes a board body 60a having one major surface, i.e. a front surface, and a light receiving portion 61 mounted on the front surface of the board body 60a. The light receiving portion 61 is comprised of, for example, a plurality of light-sensitive elements, such as image capturing elements, arranged in, for example, a two-dimensional array to constitute an imaging surface on which entering light is formed by the lens module 53 as an image. This exemplary embodiment uses semiconductor image-sensor elements, such as CMOS image-sensor elements, as the light-sensitive elements. The board body 60a is assembled to the backside of the base 52a while the light receiving portion 61 faces the lens 53.

Each of the light-sensitive elements constituting the imaging surface is sensitive to an amount or a level of light formed on the imaging area as an image. Specifically, each of the two-dimensionally arranged light-sensitive elements, which serve as pixels, is configured to receive a portion of the light directed from the optical unit 50. Then, each of the two-dimensionally arranged light-sensitive elements is configured to convert the intensity or luminance level of the received light component into an electrical pixel signal that is proportional to the luminance level of the received light component.

The imaging board 60 also includes an output circuit 62 mounted on the front surface of the board body 60a, and an imaging connector 63 mounted on the other major surface, i.e. a back surface, of the board body 60a. The output circuit 62 is electrically connected to the output circuit 62 and also electrically connected to the processing board module 7M via the imaging connector 63.

The output circuit 62 is connected to each of the light-sensitive elements of the light receiving portion 61. The output circuit 62 is configured to scan, i.e. read out, the electrical pixel signals obtained by the light receiving portion 61, and output the readout electrical pixel signals to the processing board 7 via the imaging connector 63.

In particular, the camera module 5 is installed in the camera module part 3a while the lens module 53 held by the lens barrel 51 is exposed to the outside via the exposure hole 31.

Processing Board

The processing board 7 includes a board body 7M, a processing connector 71, an image processing circuit module 72, and the external connector 73. The board body 7M has opposing first and second major surfaces; the first major surface faces the case 30. The processing connector 71, the image processing circuit module 72, and the external connector 73 are for example mounted on the first major surface of the board body 7M.

The processing connector 71 is located on the first major surface of the board body 7M so as to substantially face the imaging connector 63, and is connected to the imaging connector 63 when the case 30 having the camera module 3a is assembled to the processing board 7. The processing connector 73 is electrically connected to the image processing circuit 72, and is operative to receive the electrical pixel signals output from the output circuit 62 via the imaging connector 63, and to send the electrical pixel signals to the image processing circuit module 72.

The image processing circuit module 72 receives the electrical pixel signals sent from the processing connector 73, and performs various image-processing tasks using the electrical pixel signals. Then, the image processing circuit module 72 sends the results of the image-processing tasks to the external connector 73.

The external connector 73 is located on the right-rear corner of the first major surface of the board body 7M so as to substantially face the rear end of the connector part 3c. That is, the external connector 73 is installed in the connector part 3c when the case 30 having the connector part 3c is assembled to the processing board 7. The external connector 73 is connectable to an external device, and configured to output the results of the image-processing tasks to an external device upon the external device being connected to the external connector 73.

The image processing circuit module 72 includes many electrical and/or electronic components C including high-capacity capacitors, and some electrical and/or electronic components, each of which has a relatively higher height, are for example located on a predetermined portion of the first major surface of the board body 7M; the predetermined portion is located in front of the external connector 73 in the front direction of the external connector 73. That is, the higher-height electrical and/or electronic components are located to substantially face the upward projecting chamber 30b2 of the board case member 30b, and are installed in the upward projecting chamber 30b2 when the case 30 having the connector part 3c is assembled to the processing board 7.

The board body 7M has three through holes 85c, 86c, and 87c formed therethrough for fastening the case 30 and the cover 40 to each other. The board body 7M also has, at left side along the front-rear direction thereof, notched with a substantially U-shaped notch or groove 7a, and similarly has, at right side along the front-rear direction thereof, notched with a substantially U-shaped notch or groove 7b. The U-shaped notches 7a and 7b are located to face each other.

Housing

As described above, the housing 3 is comprised of the case 30 and the cover 40, which are constructed as separate members, and the case 30 and the cover 40 are assembled to each other, so that the housing 3 is constructed.

As described above, the case 30 and cover 40 respectively have predetermined shapes that enable the storage space for the camera module 5 and the processing board module 7M to be provided in the assembly of the case 30 and cover 40 upon the case 30 and cover 40 being assembled to each other. In particular, each of the case 30 and the cover 40 has a previously designed shape that enables the camera module 5 and the processing board module 7M to be easily mounted thereto.

Specifically, the case 30, with no cover 40 being joined thereto, has the opening rear wall; this configuration enables the camera module 5 to be easily fabricated into the case 30 from the opening rear wall.

The case 30 and cover 40 are assembled to each other while the processing board 7 is sandwiched by the case 30 and cover 40. This configuration permits the processing board 7 to be easily installed in the storage space defined by the case 30 and cover 40.

The rear member 40b of the cover 40 is configured to cover only the camera module part 3a. This configuration enables the external connector 40 to be easily exposed to the external outside of the housing 3 while the cover 40 has been assembled to the case 30.

Each of the case 30 and cover 40 is made of, for example, an aluminum material. In particular, the cover 40 has an inner surface and an outer surface, and, after the cover 40 has been assembled to the case 30, a black coating is applied to the outer surface (hatched in FIGS. 1 to 5) of the cover 40.

The board case member 30b, which constitutes the hood part 3b, of the case 30 has a substantially rectangular platy shape that provides a storage space in which the processing board 7 is stored.

The camera-module case member 30a, which constitutes the camera module part 3a, has a substantially box shape that provides a storage space in which the camera module 5 is stored. The camera-module case member 30a is located to the rearward of the board case member 30b. The storage space of the board case member 30b and the storage space of the camera-module case member 30a have no partition walls therebetween, resulting in these storage spaces communicating with each other.

The connector case member 30c, which constitutes the connector part 3c, of the case 30 has a substantially rectangular box shape whose longitudinal sides are along the front-rear direction. The rectangular-box shaped connector case member 30c provides a storage space in which the external connector 73 and the relatively higher components of the processing board 72 are stored.

Figure 4:
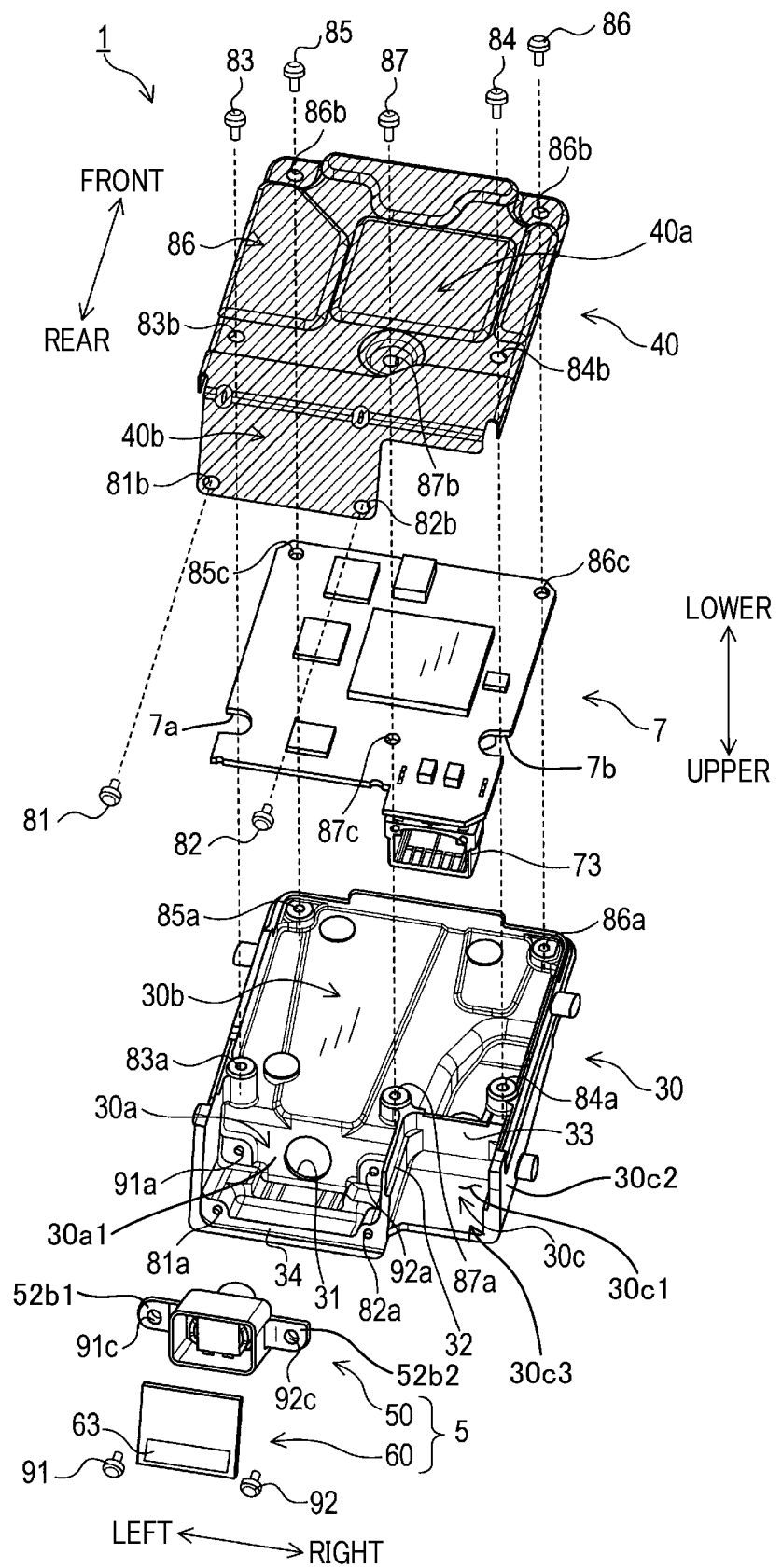
FIG. 4 is an exploded view schematically illustrating the imaging apparatus when viewed from below.

In particular, the connector case member 30c is comprised of an upper wall 30c1, a front wall 33, a right sidewall 30c2, a left sidewall 32, and an opening rear wall 30c3 (see FIGS. 1 and 4).

The left sidewall 32 serves as a partition wall that separates the storage space of the connector case member 30c from the storage space of the camera-module case member 30a. The right sidewall 33 serves as a partition wall that separates the storage space of the connector case member 30c from the storage space of the upward projecting portion 30b2.

In other words, the connector case member 30c having the partition walls 32 and 33 provide the storage space with the opening rear wall 30c3 together with the processing board 7 upon the processing board 7 being assembled to the case 30.

For example, the board case member 30b is thinner in thickness than each of the camera-module case member 30a and the connector case member 30c.

The front wall 30a1 of the camera-module case member 30a has, at respective right and left edges thereof, two threaded holes 91a and 92a for mount of the optical unit 50. The threaded holes 91a and 92a are located such that, upon the first attachment 52b1 and the second attachment 52b2 being attached to the respective right and left edges of the front wall 30a1, the front end of the lens barrel 51, i.e. the front end of the lens module 53, is exposed to the outside of the camera-module case member 30a via the exposure hole 31.

The opening rear wall 30a2 has an inner flange 34 formed on the upper edge thereof. The inner flange 34 of the opening rear wall 30a2 has, at respective right and left edges, two threaded holes 81a and 82a for joint of the cover 40.

The board case member 30b has a rear end with opposite left and right corners. The left corner of the rear end of the board case member 30b is adjacent to the camera-module case member 30a, and the right corner of the rear end of the board case member 30b is adjacent to the connector case member 30c.

The board case member 30b has, at the left corner of the rear end thereof, a first boss in which a threaded hole 83a is formed for joint of the cover 40. The board case member 30b also has, at the right corner of the rear end thereof, a second boss in which a threaded hole 84a is formed for joint of the cover 40.

The board case member 30b also has a front end with opposite left and right corners.

The board case member 30b has, at the left corner of the front end thereof, a third boss in which a threaded hole 85a is formed for joint of the cover 40. The board case member 30b also has, at the right corner of the front end thereof, a fourth boss in which a threaded hole 86a is formed for joint of the cover 40.

The board case member 30b further has a fifth boss joined to the corner of the connector case member 30c; the corner is formed by the partitioning walls 32 and 33. That is, the fifth boss is located at a boundary portion between the camera-module case member 30a, the connector case member 30c, and the board case member 30b. The fifth boss has formed therein a threaded hole 87a is formed for joint of the cover 40.

The cover 40 is comprised of a substantially rectangular flat bottom wall 40a and a substantially rectangular rear wall 40b integrally formed with each other. The bottom wall 40a covers the bottom surfaces of the camera module part 3a, i.e. the camera-module case member 30a, the board part 3b, i.e. the board case member 30b, and the connector part 3c, i.e. the connector case member 30c.

The outer peripheral edge of the bottom wall 40a is configured as an upwardly turned edge 41. A predetermined part of the upwardly turned edge 41, which faces the camera-module case member 30a, further projects upwardly to constitute the rear wall 40b covering the opening rear wall 30a2 of the camera-module case member 30a.

In particular, the case 30 has a lower end defining the opening bottom wall therein. Upon the cover 40 being assembled to the case 30, the upper surface of the turned edge 41 of the cover 40 is abutted onto the bottom surface of the lower end of the case 30.

Additionally, the rear wall 40b of the cover 40 has an inner surface S1. The cover 40 has, at respective upper corners of the rear wall 40b, two through holes 81b and 82b formed therethrough for joint of the case 30.

Figure 5:
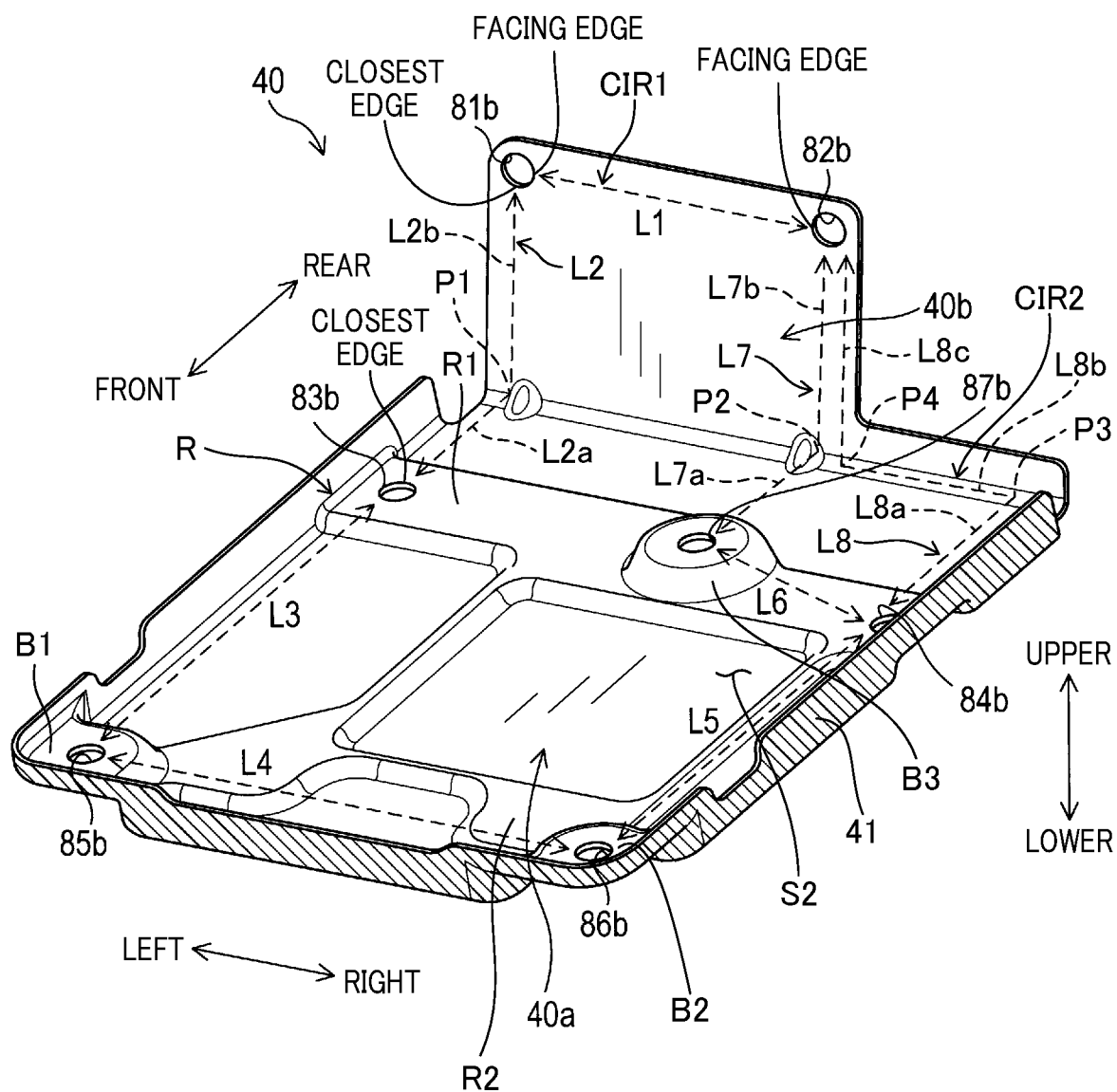
FIG. 5 is a perspective view schematically illustrating the appearance of a cover of the imaging apparatus and showing intervals between through holes formed through the cover.

The bottom wall 40a of the cover 40 has an inner surface S2, and has a rim R having a predetermined height relative to the inner surface S2. Referring to FIG. 5, the rim R has a substantially H shape.

The cover 40 has bosses B1 and B2 formed on the respective front corners of the inner surface S2 of the bottom wall 40a. Each of the bosses B1 and B2 has a predetermined height relative to the inner surface S2.

The rim R has a first support R1 arranged on the inner surface S2 of the bottom wall 40a to face the boundary portion of the board case member 30b with respect to the camera-module case member 30a and connector case member 30c. The first support R1 extends in the right-left direction of the cover 40, and has a predetermined width in the front-rear direction of the cover 40.

The rim R also has a second support R2 arranged on the inner surface S2 of the bottom wall 40a to extend from the first support R1 to be joined to the bosses B1 and B2.

The bottom wall 40a of the cover 40 has two through holes 83b and 84b formed through the first support R1 of the rim R and the bottom wall 40a for joint of the case 30, and has two through holes 85b and 86b formed through the respective bosses B1 and B2 and the bottom wall 40a for fastening of the case 30 and the processing board 7.

The through hole 83b is substantially aligned with the through hole 81b in the front-rear direction of the cover 40 to face the boundary portion between the camera-module case member 30a and the board case member 30b. The through hole 84b is arranged to face the boundary portion between the connector case member 30c and the board case member 30b.

The through hole 85b, which is arranged at the left corner of the bottom wall 40a, is substantially aligned with the through hole 83b in the front-rear direction of the cover 40. The through hole 86b, which is arranged at the right corner of the bottom wall 40a, is aligned with the through hole 85b in the right-left direction, and aligned with the fourth through hole in the front-rear direction.

The cover 40 has a boss B3 formed on the first support R1 of the rim R and located to face the fifth both of the case 30. The boss B3 has a predetermined height relative to the upper surface of the first support R1.

The cover 40 has a through hole 87b formed through the boss B3, the first support R1, and the bottom wall 40a for fastening of the case 30 and the processing board 7. The through hole 87b is substantially aligned with the through hole 82b in the front-rear direction of the cover 40 and substantially aligned with the third through hole 83b in the right-left direction. The through hole 87b is also substantially aligned with the boundary portion between the camera-module case member 30a, the connector case member 30c, and the board case member 30b in the vertical direction.

Specifically, the through holes 81b to 87b are arranged to be aligned with the respective threaded holes 81a to 87a upon the cover 40 being assembled to the case 30.

In particular, referring to FIG. 5, the adjacent through holes 81b and 82b have an interval L1 along the inner surface S1 of the rear wall 40b. The interval L1 is defined as a shortest distance between the facing edges of the respective top openings of the through holes 81b and 82b along the inner surface S1 of the rear wall 40b in the right-left direction.

The adjacent through holes 81b and 83b have an interval L2. The interval L2 is defined as the sum of a shortest distance L2a from the closest edge of the top opening surface of the through hole 83b up to a point P1 on the inner surface S1 and a shortest distance L2b extending from the point P1 to the closest edge of the through hole 81b along the inner surface S1 in the vertical direction. The closest edge of the top opening surface of the through hole 83b is the closest to the inner surface S1 of the rear wall 40b, and the closest edge of the through hole 81b is the closest to the point P1.

The adjacent through holes 83b and 85b have an interval L3. The interval L3 is defined as a shortest distance extending, in the front-rear direction, between the facing edges of the top opening surfaces of the through holes 83b and 85b.

The adjacent through holes 85b and 86b have an interval L4. The interval L4 is defined as a shortest distance extending, in the right-left direction, between the facing edges of the top opening surfaces of the through holes 85b and 86b.

The adjacent through holes 86b and 84b have an interval L5. The interval L5 is defined as a shortest distance extending, in the front-rear direction, between the facing edges of the top opening surfaces of the through holes 86b and 84b.

The adjacent holes 84b and 87b have an interval L6. The interval L6 is defined as a shortest distance extending between the facing edges of the top opening surfaces of the through holes 84b and 87b.

The adjacent through holes 82b and 87b have an interval L7. The interval L7 is defined as the sum of a shortest distance L7a from the closest edge of the top opening surface of the through hole 87b up to a point P2 on the inner surface S1 and a shortest distance L7b extending from the point P2 to the closest edge of the through hole 82b along the inner surface S1 in the vertical direction. The closest edge of the top opening surface of the through hole 87b is the closest to the inner surface S1 of the rear wall 40b, and the closest edge of the through hole 82b is the closest to the point P2.

The adjacent through holes 84b and 82b have an interval L8. The interval L8 is defined as the sum of (1) A shortest distance L8a extending, in the front-rear direction, from the closest edge of the top opening surface of the through hole 84b up to a point P3 on the inner surface of the turned edge 41

(2) A shortest distance L8b extending, in the right-left direction, from the point P3 up to a point P4 along the inner surface of the turned edge 41; the point P4 faces the center axis of the through hole 82b in the vertical direction (3) A shortest distance L8c extending, in the vertical direction, from the point P4 to the closest edge of the through hole 82b along the inner surface S1

The closest edge of the top opening surface of the through hole 84b is the closest to the inner surface of the turned edge 41, and the closest edge of the through hole 82 is the closest toe point P4.

The positional relationship between the threaded holes 81a and 82a is substantially identical to the positional relationship between the corresponding through holes 81b and 82b. The positional relationship between the threaded holes 81a and 83a is substantially identical to the positional relationship between the corresponding through holes 81b and 83b. The positional relationship between the threaded holes 83a and 85a is substantially identical to the positional relationship between the corresponding through holes 83b and 85b. The positional relationship between the threaded holes 85a and 86a is substantially identical to the positional relationship between the corresponding through holes 85b and 86b. The positional relationship between the threaded holes 86a and 84a is substantially identical to the positional relationship between the corresponding through holes 86b and 84b. The positional relationship between the threaded holes 87a and 82a is substantially identical to the positional relationship between the corresponding through holes 87b and 82b. The positional relationship between the threaded holes 84a and 82a is substantially identical to the positional relationship between the corresponding through holes 84b and 82b.

In particular, the length of each of the first to eighth intervals L1 to L8 is configured to be equal to or less than $\lambda/2$ where X represents the wavelength of signals having a predetermined maximum frequency; the signals are used by at least one device installed in the vehicle or are expected to be received by the processing board 7 as noise, i.e. electromagnetic noise. The signals as noise are sent from at least one of devices installed in the vehicle or sent from other systems around the imaging apparatus 1.

For example, if the vehicle processing board 7 is configured to communicate traffic and travel information with a Vehicle Information and Communication System (VICS®) using the maximum frequency of 2.5 GHz, then $\lambda/2$ is set to substantially 60 millimeters (mm).

Setting each of the intervals L1 to L8 to a length equal to or less than half of the wavelength $\lambda$ determined based on the maximum frequency of 2.5 GHz prevents noise whose wavelengths are longer than the wavelength $\lambda$ from entering the inside of the assembly of the case 30 and the cover 40 via the corresponding one of the intervals L1 to L8.

If there is a situation where the intensities of signals within the maximum frequency used by the processing board 7 are greatly attenuated with distance, it is possible to set each of the intervals L1 to L8 to a length that is longer than half of the wavelength $\lambda$. If the signal processing board 7 has a high allowable radiation noise level, it is possible to set each of the intervals L1 to L8 to a length that is longer than half of the wavelength $\lambda$. If the imaging apparatus 1 has a low level of noise irradiated therefrom, it is possible to set each of the intervals L1 to L8 to a length that is longer than half of the wavelength $\lambda$. If the imaging apparatus 1 has a high allowable level of noise irradiated to the imaging apparatus 1 so that the level of noise can be ignored, it is possible to set each of the intervals L1 to L8 to a length that is longer than half of the wavelength $\lambda$.

For example, if the processing board 7 is configured to communicate traffic and travel information with a communication device using Dedicated Short Range Communications (DSRC) technologies based on the maximum frequency of 5.8 GHz, each of the intervals L1 to L8 is set to a length that is equal to or less than 25 mm corresponding to the $\lambda/2$. However, even if the processing board 7 is configured to communicate traffic and travel information with a communication device using the DSRC technologies based on the maximum frequency of 5.8 GHz, each of the intervals L1 to L8 can be set to a length that is more than 25 mm corresponding to the $\lambda/2$ as long as the level of noise caused from the communications based on the DSRC technologies is sufficiently low.

In other words, the camera module 5 and the processing board 7 are arranged in a first closed circuit CIR1 enclosed by a line passing through the through holes 81b, 82b, 87b, 84b, 86b, 85b, 83b, and 81b. Additionally, the external connector 73 is arranged in a second closed circuit CIR2 enclosed by a line passing through the through hole 82b, the right-rear corner of the bottom wall 40a of the cover 40, the through hole 84b, the through hole 87b, and the through hole 82b.

Assembling

The following describes how the imaging apparatus 1 is assembled.

First, the camera module 5 is installed in the camera-module case member 30a of the case 30 while the front end of the lens barrel 51 is exposed to the outside of the camera-module case member 30a via the exposure hole 31 and the through holes 91c and 92c of the camera module 5 are aligned with the respective threaded holes 91a and 92a of the camera module storage case 30a. Then, two threaded bolts 91 and 92 are inserted into the respective threaded holes 91a and 92a via the through holes 91c and 92c so as to be threadably fastened to the threaded holes 91a and 92a. This enables the camera module 5 to be fixedly mounted in the camera-module case member 30a.

Next, for example, the processing board 7 is mounted to the cover 40 such that (1) The second major surface of the board body 7M faces the inner surface S2 of the bottom wall 40a (2) The through holes 85c, 86c, and 87c are aligned with the respective through holes 85b, 86b, and 87b (3) The U-shaped notches 7a and 7b are aligned with the respective through holes 83b and 84b Then, the case 30 is mounted to the cover 40 such that (1) The threaded holes 81a and 82a are aligned with the respective through holes 81b and 82b of the rear wall 40b of the cover 40

(2) The threaded holes 83a and 84a are aligned with the respective through holes 83b and 84b via the U-shaped notches 7a and 7b (3) The threaded holes 85a, 86a, and 87a are aligned with the respective through holes 85b, 86b, and 87b through the respective through holes 85c, 86c, and 87c (4) The bottom surface of the lower end of the case 30 is abutted onto the upper surface of the turned edge 41 of the cover 40

Thereafter, the case 30, the processing board 7, and the cover 40 are assembled to each other to constitute the imaging apparatus 1 using seven threaded bolts 81 to 87 by (1) Inserting the two threaded bolts 81 and 82 into the respective threaded holes 81a and 82a from the rear side of the rear wall 40b of the cover 40 to thereby threadably fasten the rear wall 40b of the cover 40 to the camera-module case member 30a (2) Inserting the two threaded bolts 83 and 84 into the respective threaded holes 83a and 84a via the U-shaped notches 7a and 7b from the bottom side of the bottom wall 40a of the cover 40 to thereby threadably fasten the bottom wall 40a of the cover to the case 30 while sandwiching the processing board 7 therebetween (3) Inserting the three threaded bolts 85 to 87 into the respective threaded holes 85a to 87a via the through holes 85c to 87c from the bottom side of the bottom wall 40a of the cover 40 to thereby threadably fasten the bottom wall 40a of the cover to the case 30 while sandwiching the processing board 7 therebetween The through holes 81b to 87b of the cover 40, which are threadably fastened to the case 40 with the respective threaded bolts 81 to 87, respectively serve as fastening portions of the cover 40. That is, the imaging apparatus 1 includes the threaded bolts 81 to 87 threadably fitted in the respective threaded holes 81a to 87a through the respective through holes 81b to 87b.

Advantageous Effects

The imaging apparatus 1 described in detail set forth above is configured such that the length of each of the first to eighth intervals L1 to L8 between the through holes 81b to 87b or the threaded holes 81a to 87a is set to be equal to or less than half of the wavelength λ of signals having the maximum frequency used by the processing board 7 or received by the processing board 7 as noise. This prevents, even if the cover 40 is deformed due to any cause, gaps whose lengths are longer than half of the wavelength λ from occurring between the case 30 and the cover 40. This results in reduction in noise leakage from the inside of the housing 3 to the outside of the housing 3 and/or noise entrance into the inside of the housing 3 from the outside of the housing 3 even if the cover 40 is deformed.

Additionally, the imaging apparatus 1 is configured such that the rear wall 40b of the cover 40 has the through holes 81b and 82b formed therethrough, and the rear wall 40b is abutted onto the inner flange 34 of the opening rear wall 30a2 of the camera-module case member 30a to thereby cover the opening rear wall 30a2 of the camera-module case member 30a.

This configuration enables the rear wall 40b of the cover 40 to be in intimate contact with the camera-module case member 30a, resulting in the camera module part 3a of the housing 3 installing therein the camera module 5 having higher noise-sealing capability.

In particular, the rear wall 40b of the cover 40 is fastened to the inner flange 34 of the opening rear wall 30a2 of the camera-module case member 30a while the rear wall 40b is in intimate contact with the inner flange 34 of the opening rear wall 30a2 of the camera-module case member 30a. This results in a more increase in the contact area between the case 30 and the cover 40, further resulting in reduction in noise leakage from the inside of the housing 3 to the outside of the housing 3 and/or noise entrance into the inside of the housing 3 from the outside of the housing 3.

Additionally, the housing 3 of the imaging apparatus 1 is configured such that the case 30 and the cover 40 is assembled to each other while the bottom surface of the lower end of the case 30 is abutted onto the upper surface of the turned edge 41 of the cover 40. This results in the cover 30 being in high intimate contact with the cover 40, resulting in reduction in noise leakage from the inside of the housing 3 to the outside of the housing 3 and/or noise entrance into the inside of the housing 3 from the outside of the housing 3.

Modifications

The present disclosure is not limited to the aforementioned exemplary embodiment, and can be variably modified within the scope of the present disclosure.

The case 30 and the cover 40 according to the exemplary embodiment are fastened to each other with the threaded holes 81a to 87a, the through holes 81b to 87b, and the threaded bolts 81 to 87, but the present disclosure is not limited thereto. Specifically, the cover 40 can be closely riveted, swaged, or adhered to the case 30 at plural fastening portions of the cover 40 whose adjacent intervals are each set to be equal to or less than half of the wavelength λ of signals having the maximum frequency used by the processing board 7 or received by the processing board 7 as noise.

For example, the cover 40 can include, as the plural fastening portions, first to eighth fastening portions respectively corresponding to the through holes 81b to 87b.

For example, the first interval between the first and second fastening portions can be defined as a shortest distance between the facing edges of the first and second fastening portions along the inner surface S1 of the rear wall 40b in the right-left direction.

The second interval between the adjacent first and third fastening portions can be defined as the sum of a first shortest distance from the closest edge of the third fastening portion up to a point on the inner surface S1 and a second shortest distance extending from the point to the closest edge of the first fastening portion along the inner surface S1 in the vertical direction.

The third interval between the adjacent third and fifth fastening portions can be defined as a shortest distance extending, in the front-rear direction, between the facing edges of the third and fifth fastening portions.

The fourth interval between the fifth and sixth fastening portions can be defined as a shortest distance extending, in the right-left direction, between the facing edges of the fifth and sixth fastening portions.

The fifth interval between the sixth and fourth fastening portions can be defined as a shortest distance extending, in the front-rear direction, between the facing edges of the sixth and fourth fastening portions.

The sixth interval between the fourth and seventh fastening portions can be defined as a shortest distance extending between the facing edges of the fourth and seventh fastening portions.

The seventh interval between the second and seventh fastening portions can be defined as the sum of a shortest distance from the closet edge of the seventh fastening portion up to a point on the inner surface S1 and a shortest distance extending from the point to the closest edge of the second fastening portion along the inner surface S1 in the vertical direction.

The eighth interval between the fourth and second fastening portions can be defined as the sum of (1) A shortest distance extending, in the front-rear direction, from the closest edge of the fourth fastening portion up to a first point on the inner surface of the turned edge 41

(2) A shortest distance extending, in the right-left direction, from the first point up to a second point along the inner surface of the turned edge 41; the second point faces the second fastening portion in the vertical direction (3) A shortest distance extending, in the vertical direction, from the second point to the closest edge of the second fastening portion along the inner surface S1

The length of each of the first to eighth intervals L1 to L8 between the through holes 81b to 87b or the threaded holes 81a to 87a is set to be equal to or less than half of the wavelength λ of signals having the maximum frequency used by the processing board 7 or received by the processing board 7 as noise. The present disclosure is however not limited to the configuration.

Specifically, if transmitting and receiving antennas of another system are arranged around the imaging apparatus 1 and at least one of the intervals L1 to L8 is located to face the transmitting and receiving antennas, the at least one of the intervals L1 to L8 can be set to be narrower than the other intervals that do not face the transmitting and receiving antennas. This modification results in reduction of the impact of noise to the transmitting and receiving antennas and in reduction of the impact of noise received from the transmitting and receiving antennas.

The present disclosure is applied to the imaging apparatus 1 equipped with the single camera module 5, i.e. a monocular camera module, but can be applied to an imaging apparatus including a stereo camera system equipped with two camera modules 5.

In the exemplary embodiment, bending a single metallic flat plate forms the cover 40 including the bottom wall 40a and the rear wall 40b integrated with each other. The present disclosure is however not limited thereto. Specifically, the imaging apparatus 1 can include a cover that is comprised of the integrated assembly of the bottom wall 40a and the rear wall 40b, which are respectively made of different members.

Each of the case 30 and the cover 40 according to the exemplary embodiment can be made of an aluminum material, but can be made of another metallic material.

The functions of one element in the above embodiment can be distributed as plural elements, and the functions that plural elements have can be combined into one element. At least part of the structure of the above embodiment can be replaced with a known structure having the same function as the at least part of the structure of the embodiment. A part of the structure of the above embodiment can be eliminated. All aspects included in the technological ideas specified by the language employed by the claims constitute embodiments of the present disclosure.

While the illustrative embodiment and its modifications of the present disclosure have been described herein, the present disclosure is not limited to the embodiments and their modifications described herein. Specifically, the present disclosure includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An imaging apparatus for mounting to a windshield of a vehicle, the vehicle having a predetermined front-rear direction and a predetermined vertical direction, the imaging apparatus comprising:
    a camera module configured to:
        capture an image; and
        output an image signal based on the captured image;
    a processing board arranged to be lower than the camera module in the vertical direction and configured to:
        receive the image signal output from the camera module; and
        perform at least one image-processing task based on the received image signal;
    a case comprising:
        a camera-module case member having an opening bottom wall in the vertical direction and an opening rear wall in the front-rear direction and configured to store the camera module; and
        a board case member having an opening bottom wall in the vertical direction and configured to store the processing board; and
    a cover fastened to the case, the cover comprising:
        a bottom wall arranged to cover the opening bottom wall of the camera-module case member and the opening bottom wall of the board case member; and
        a rear wall arranged to cover the opening rear wall of the camera-module case member,
        at least one of the bottom wall and the rear wall having a plurality of fastening portions at which the case and the cover are closely fastened to each other,
        the plurality of fastening portions including at least first and second adjacent fastening portions separated by an interval distance therebetween, the interval distance being set to be equal to or less than half of a wavelength of a signal having a predetermined maximum frequency, the signal having the maximum frequency being used by at least one device installable in the vehicle or being expected to be received by the processing board as noise.

2. The imaging apparatus according to claim 1, wherein:
    the bottom wall and the rear wall of the cover are integrally made of a single metallic plate being bent in the shape of the cover;
    the bottom wall of the cover has a rear end in the front-rear direction; and
    the rear wall of the cover is configured to continuously extend from the rear end of the bottom wall upwardly in the vertical direction to face the camera module stored in the camera-module case member.

3. The imaging apparatus according to claim 1, wherein the rear wall of the cover has at least one of the plurality of fastening portions.

4. The imaging apparatus according to claim 3, wherein the at least one of the plurality of fastening portions is located at an upper end of the rear wall in the vertical direction.

5. The imaging apparatus according to claim 1, wherein:
each of the plurality of fastening portions of the at least one of the bottom wall and the rear wall comprises a plurality of through holes formed therethrough,
the imaging apparatus further comprising:
a plurality of bolts fitted through the respective through holes to thereby fasten the case and the cover to each other.

6. The imaging apparatus according to claim 1, wherein:
the opening rear wall of the camera-module case member has an inner flange,
the rear wall of the cover being abutted onto the inner flange of the opening rear wall of the camera-module case member.

7. An imaging apparatus for mounting to a windshield of a vehicle, the vehicle having a predetermined front-rear direction, a predetermined right-left direction, and a predetermined vertical direction, the imaging apparatus comprising:
a camera module configured to:
capture an image; and
output an image signal based on the captured image;
a processing board arranged to be lower than the camera module in the vertical direction and configured to:
receive the image signal output from the camera module; and
perform at least one image-processing task based on the received image signal;
an external connector connected to the processing board and configured to externally output a result of the at least one image-processing task;
a case comprising:
a camera-module case member having an opening bottom wall in the vertical direction and an opening rear wall in the front-rear direction and configured to store the camera module;
a board case member arranged at a front side of the camera-module case member and having an opening bottom wall in the vertical direction, the board case member being configured to store the processing board; and
a connector case member arranged adjacent to the camera-module case member and arranged at a rear side of the board case member, the connector case member having an opening bottom wall in the vertical direction and being configured to store the external connector;
a cover fastened to the case, the cover comprising:
a bottom wall arranged to cover the opening bottom wall of the camera-module case member, the opening bottom wall of the board case member, and the opening bottom wall of the connector case member; and
a rear wall arranged to cover the opening rear wall of the camera-module case member; and
first to seventh bolts,
the rear wall having first and second through holes formed therethrough at respective upper corners thereof,
the bottom wall having:
third and fourth through holes formed therethrough, the third through hole being substantially aligned with the first through hole in the front-rear direction to face a first boundary portion between the camera-module case member and the board case member, the fourth through hole being arranged to face a second boundary portion between the camera-module case member, the board case member, and the connector case member;
fifth and sixth through holes formed through respective front corners of the bottom wall and aligned with each other in the right-left direction, the fifth through hole being aligned with the third through hole, the sixth through hole being aligned with the fourth through hole;
a seventh through hole formed therethrough and substantially aligned with the second through hole in the front-rear direction, the seventh through hole being substantially aligned with the third through hole in the right-left direction;
the first to seventh bolts being fitted through the respective first to seventh through holes to thereby fasten the case and the cover to each other,
the first and second through holes having a first interval distance therebetween, the first and third through holes having a second interval distance therebetween, the third and fifth through holes having a third interval distance therebetween, the fifth and sixth through holes having a fourth interval distance therebetween, the sixth and fourth through holes having a fifth interval distance therebetween, the fourth and seventh through holes having a sixth interval distance therebetween, the seventh and second through holes having a seventh interval distance therebetween, the second and fourth through holes having an eighth interval distance therebetween,
each of the first to eighth interval distances being set to be equal to or less than half of a wavelength of a signal having a maximum frequency, the signal having the maximum frequency being used by at least one device installable in the vehicle or being expected to be received by the processing board as noise,
the camera module and the processing board being arranged in a closed circuit, the closed circuit being enclosed by a line passing through the first through hole, the second through hole, the seventh through hole, the fourth through hole, the sixth through hole, the fifth through hole, the third through hole, and the first through hole.

8. The imaging apparatus according to claim 7, wherein:
the external connector is arranged in a second closed circuit, the second closed circuit being enclosed by a line passing through the second through hole, a right-rear corner of the bottom wall of the cover, the fourth through hole, the seventh through hole, and the second through hole.

* * * * *